United States Patent [19]
Fordham

[11] Patent Number: 5,812,690
[45] Date of Patent: Sep. 22, 1998

[54] SET UP PROCEDURE TO ENABLE ACCURATE CENTROIDING IN PHOTON COUNTING DETECTORS

[75] Inventor: John Lawrence Fordham, Middlesex, United Kingdom

[73] Assignee: University College London, London, United Kingdom

[21] Appl. No.: 104,057

[22] PCT Filed: Feb. 6, 1992

[86] PCT No.: PCT/GB92/00224

§ 371 Date: Oct. 1, 1993

§ 102(e) Date: Oct. 1, 1993

[87] PCT Pub. No.: WO92/14127

PCT Pub. Date: Aug. 20, 1992

[51] Int. Cl.[6] .................................................... G06T 7/60
[52] U.S. Cl. ......................... 382/100; 382/288; 348/172
[58] Field of Search ................................... 382/1, 48, 18, 382/8, 291, 151, 103, 168, 169, 100, 288; 250/203.6, 206.1; 348/230, 171, 172

[56] References Cited

U.S. PATENT DOCUMENTS

| 4,499,597 | 2/1985 | Alves | 382/41 |
| 4,637,052 | 1/1987 | Thoe | 382/1 |
| 4,853,968 | 8/1989 | Berkin | 382/18 |
| 4,979,221 | 12/1990 | Perryman et al. | 382/1 |
| 5,086,478 | 2/1992 | Kelly-Mahaffey et al. | 382/48 |

OTHER PUBLICATIONS

Fordham "The Use of CCDs in Photon Counting Detectors." Proc. ESO–OHP Workshop on the Optimization of the Use of CCD Detectors in Astronomy, 1987, pp. 309–314.

Fordham et al. "Development of the MIC Photon Counting Detector for Astronomical Applications" Proc. SPIE. Instrumentation in Astronomy VII, vol. 1235, 1990, pp. 636–643.

Fordham etal. "Interpolative Centroiding in Photon Counting Detectors." 9th Santa Cruz Summer Workshop in Astronomy and Astrophysics, pp. 582–588.

Carter, M.K., et al., "Transputer based image photon counting detector." *Society of Photo–Optical Instrumentation Engineers*, vol. 1235 Instrumentation in Astronomy VII (1990), pp. 644–656.

Dick, James, et al. "Design Fundamentals of Algorithms for Photon–Counting Systems." *Publications of the Astronomical Society of the Pacific*, vol. 101 (Jul. 1, 1989), pp. 684–689.

Bulau, Scott E. "Simulations of Various Centroiding Algorithms." *Proceedings of the Society of Photo–Optical Instrumentation Engineers*, vol. 627 (Nov. 1, 1986), pp. 680–687.

Boksenberg, A., et al. "Interpolative Centroiding in CCD–Based Image Photon Counting Systems." *Advances in Electronics and Electron Physics*, vol. 64A (Oct. 1, 1985), pp. 33–47.

Merat, P., et al. "A Modular, Large Format, Two Dimensional Photon Counting Imaging System." *Proceedings of the Society of Photo–Optical Instrumentation Engineers*, vol. 868 (Sep. 1, 1987), pp. 31–39.

Bellis, J.G., et al. "A New Real–Time Centroiding Technique for Photon–Counting Detectors." *Publications of the Astronomical Society of the Pacific*, vol. 103 (Feb. 15, 1991), pp. 253–257.

*Primary Examiner*—Michael T. Razavi
*Assistant Examiner*—Jon Chang
*Attorney, Agent, or Firm*—Darby & Darby

[57] ABSTRACT

A method is provided for setting up a photon counting detector, to enable it to carry out a centroiding procedure in which a photon event occurring in a given range is allocated to one of a plurality of channels into which the range is divided. The method comprises the steps of: a) sub-dividing the range into a plurality of channels of preferably equal width and loading the channel boundaries into a look-table; b) performing an integration on a flat field and allocating photon events to the channels defined in step a); c) counting the number of events allocated to each channel; d) altering the channel boundaries in directions tending to equalize the number of events allocated to each; and, optionally, e) repeating steps b), c) and d) until the variation between the number of events held by the channels is at an acceptable level.

10 Claims, 6 Drawing Sheets

SET UP PROCEDURE TO ENABLE ACCURATE CENTROIDING IN PHOTON COUNTING DETECTORS

FIELD OF THE INVENTION

This invention relates to a centroiding method for use with photon counting detectors.

BACKGROUND OF THE INVENTION

Over the past few years a number of photon counting detectors that employ charge-coupled devices (CCDs) for event capture have been developed. These detectors all use interpolative centroiding, at some level, to enhance the resolution of the system, event centres being found with an accuracy as high as $\frac{1}{8}$th of a CCD pixel in each of the x and y axes, i.e. to $\frac{1}{64}$th of a pixel. This process is referred to as the allocation of an event to a channel. Thus, each pixel may be divided into as many as 8 channels, or special subdivisions along each axis. It should be understood that although the invention is described below in relation to dividing each pixel into 8 channels along each axis, it is equally applicable if the number of channels is more or less than 8.

Recent publications (Fordham, J. L. A. and Book, R. N. 1988, Robinson, L. B., ed., "Instrumentation for Ground-Based optical Astronomy, Present and Future (Springer-Verlag, Now York), p.582; and Dick, J., Jenkins, C. and Ziabicki, J. 1989, PASP, 101, 684) discuss errors associated with the centroiding algorithms and the effect on system fixed pattern noise. In these papers it is assumed that the event profile is a Gaussian, showing the effect of variations in, for example, pulse width, noise, and DC bias on centroiding accuracy. However, when analyzed it is found that events do not have a Gaussian profile and so the approach adopted in those papers is less effective than it would otherwise be.

Photon counting detectors employing CCD's can be split into two categories, namely where there is lens coupling between the intensifier and the CCD; and where there is fibre optic coupling between the intensifier and CCD.

For the lens coupled system, distortions are introduced onto the event profile by the lens, where the distortion is dependent upon the radial position of the event with respect to the optical centre. These distortions are due to aberrations within the lens. For this type of detector, where there is no defined pulse shape, a single accurate centroiding algorithm, whether hardware or software generated, cannot be employed. This means that, from the algorithm, there always will be centroiding errors which cause fixed pattern noise similar to that discussed in the above referenced papers. The only way to overcome this is to include a smoothing function within the centroiding circuit.

For the fibre optically coupled systems, if very localized shears in the coupler are discounted, then the CCD will produce an accurate image of each event generated on the intensifier output phosphor. However, fibre optic coupling is only normally employed on micro-channel plate (MCP) intensifiers, and these give rise to an additional form of distortion due to the bias angle of the channel plates with respect to the output phosphor. This bias angle, typically of 8 degrees, introduces an asymmetrical profile to each event which is constant over the whole active area and can thus be fitted, in principle, by a single algorithm. A typical event is shown in FIG. 1a of the accompanying drawings and a profile of a slice through the centre of this event is shown in FIG. 1b.

The event is noticeably asymmetrical, the direction of the asymmetry being dependent upon the orientation of the CCD with respect to the channel plate. Fitting an error free algorithm to this profile such that each event is accurately centered to $\frac{1}{8}$th of a CCD pixel or better would be very complex in hardware and in software would be very time consuming, limiting the dynamic range by introducing a maximum count rate that can be processed. It is an object of the present invention to provide a centroiding technique that overcomes such problems and provides accurate centroiding with low fixed pattern noise.

Before describing the present invention a description will be given of the centroiding algorithm conventionally used to allocate an event to a channel.

A typical five pixel centre of gravity-fitting algorithm is of the form:

$$\text{Centre of Gravity} = M/N \qquad (1)$$

where $M=2A+B-D-2E$, $N=A+B+C+D+E$, and A,B,C,D and E are the 8-bit data values in 5 contiguous pixels, C having the highest amplitude. This algorithm is depicted in FIG. 2.

The algorithm can be implemented using discrete integrated circuits and this is what is conventionally done. It can in theory be implemented directly as a look-up table. However, there is a physical constraint against this as a 40-bit address word would be required to allow for all combinations of A through to E—in other words $10^{12}$ memory locations, as in FIG. 3a. As is described below, the present invention employs a look-up table, and it is a novel feature of the preferred embodiment thereof that the problem just described is reduced by calculating M and N in equation 1 discretely in hardware and then feeding these values as the address to the look-up table, the data contained in that address being the result of the division M/N, as in FIG. 3b.

Assuming pixel C had the highest value data, that is, an event was central in the 5 pixels, and assuming events very symmetrical then the result of M/N would always be in the range −0.5 to +0.5, that is ±½ a pixel from the centre of C. The requirement is to split each pixel into 8 separate channels and place the centroid in one of then. Thus eight M/N result ranges can be defined as shown in Table 1 below.

TABLE 1

| M/N | Channel Number | Centroid position |
| --- | --- | --- |
| −0.5 → −0.375 | 0 | 000 |
| −0.375 → −0.25 | 1 | 001 |
| −0.25 → −0.125 | 2 | 010 |
| −0.125 → 0 | 3 | 011 |
| 0 → 0.125 | 4 | 100 |
| 0.125 → 0.25 | 5 | 101 |
| 0.25 → 0.375 | 6 | 110 |
| 0.375 → 0.5 | 7 | 111 |

Allowing for every combination of M and N the look-up table can be programmed as above. If an integration is then started with the system, and data is accumulated on a flat field, the resulting image would look something like the graph (a) in FIG. 7, where there could be a large amount of fixed pattern noise with a period of 8 channels or one CCD pixel. This noise is due to errors in fitting the algorithm to the data due to mismatches associated with asymmetrical event profiles and parameters such as pulse width.

It has now been appreciated that the fundamental reason for the fixed pattern noise is that the channel sizes as defined in Table 1, although equal in width, are unequal in that some channels have more events placed in then than other channels.

According to the present invention there is provided a method of setting up a photon counting detector, to enable it to carry out a centroiding procedure in which a photon event occurring in a given range is allocated to one of a plurality of channels into which the range is divided, the said method comprising the steps of:

(a) sub-dividing the range into a plurality of channels of preferably equal width and loading the channel boundaries into a look-up table;

(b) performing an integration on a flat field and allocating photon events to the channels defined in step (a);

(c) counting the number of events allocated to each channel;

(d) altering the channel boundaries in directions tending to equals the number of events allocated to each; and, optionally, (e) repeating steps (b), (c) and (d) until the variation between the numbers of events held by the channels is at an acceptable level.

The channel boundaries thus established are then employed in subsequent use of the system.

BRIEF DESCRIPTION OF THE DRAWING

In the accompanying drawings:

FIG. 1 comprises FIG. 1a and FIG. 1b.

FIG. 1b is a profile of a slice through the event of FIG. 1a;

FIG. 3, which comprises

The aforementioned Figures are all described above.

Figure 4:
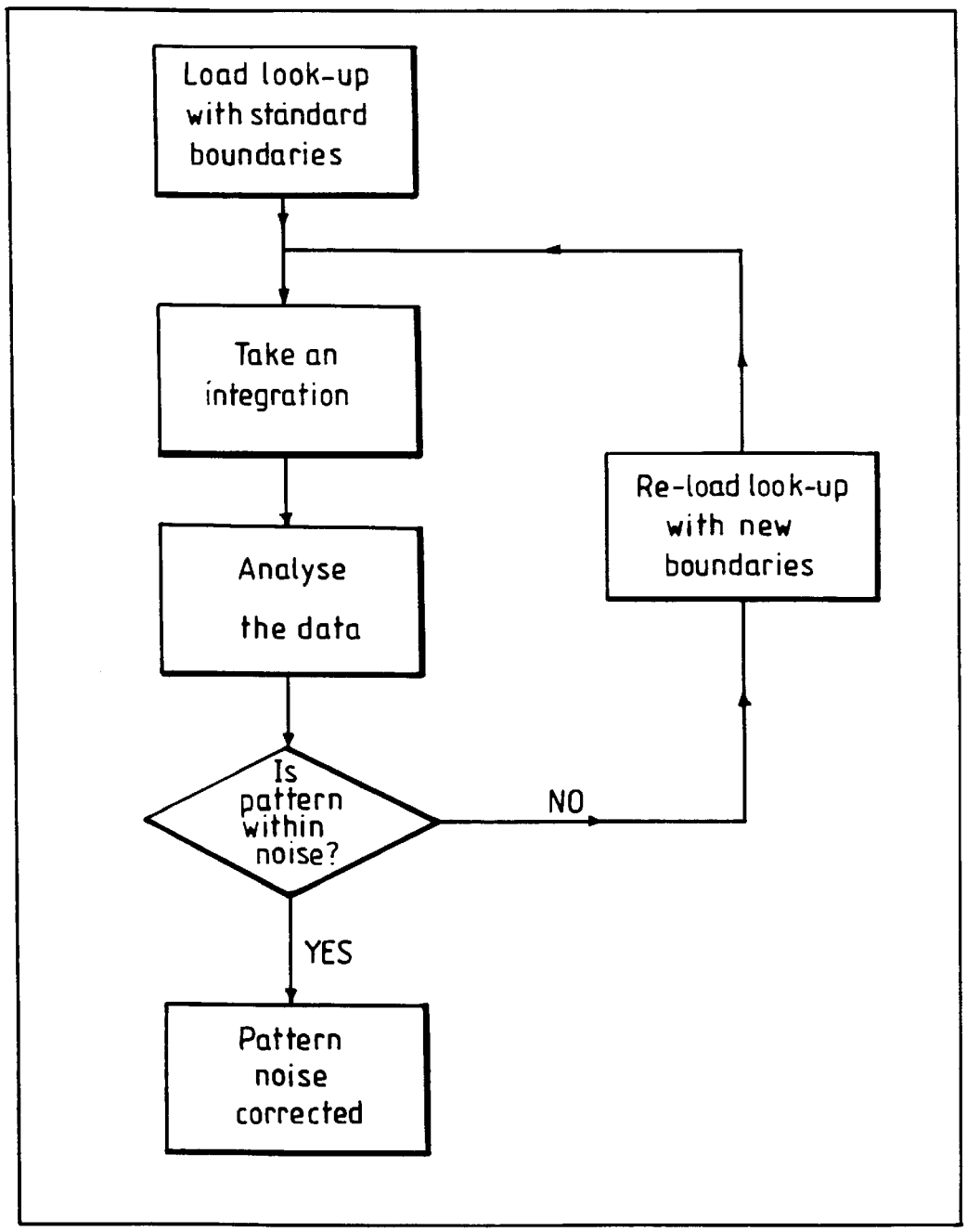
Figure 5:
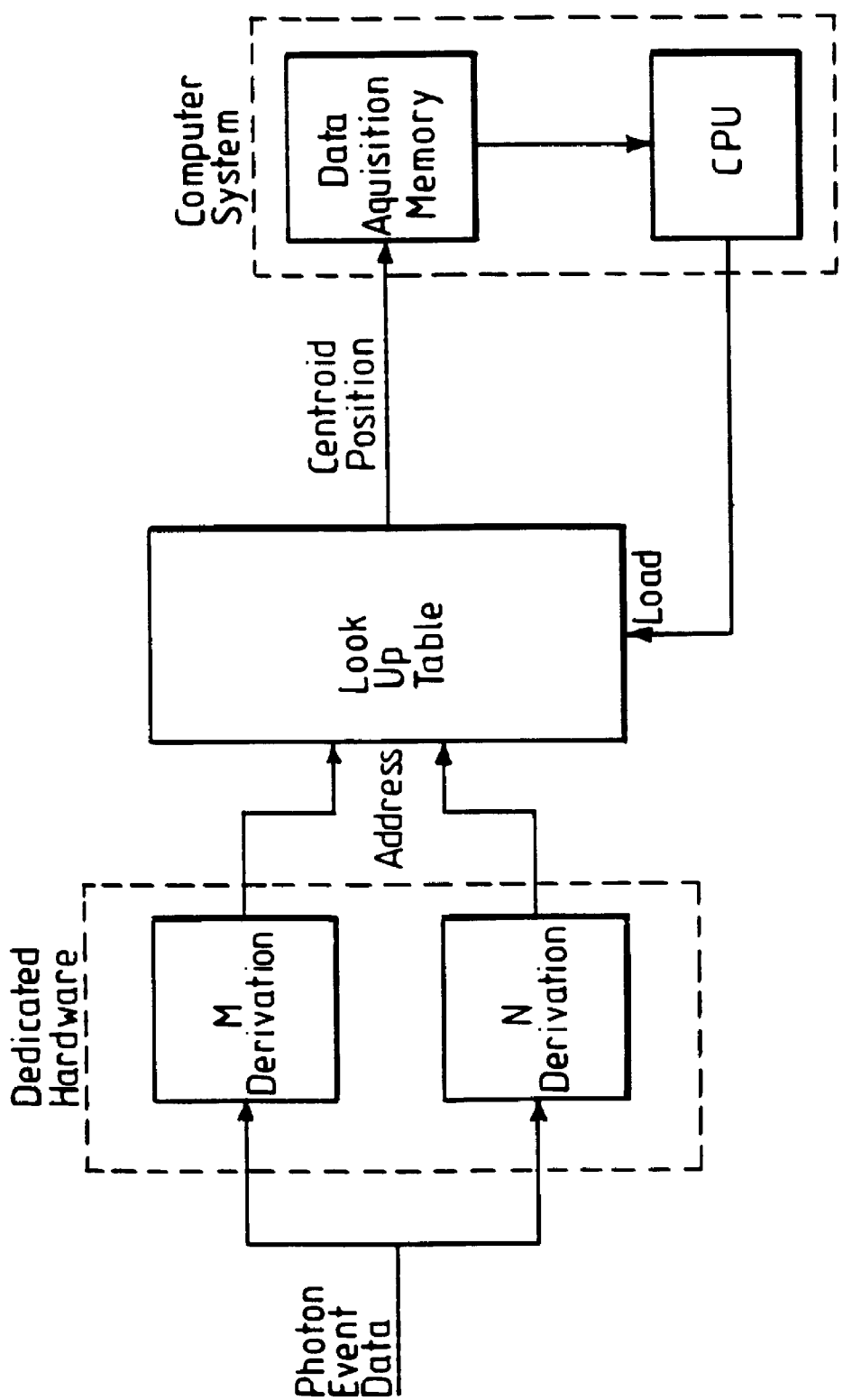
Figure 6:
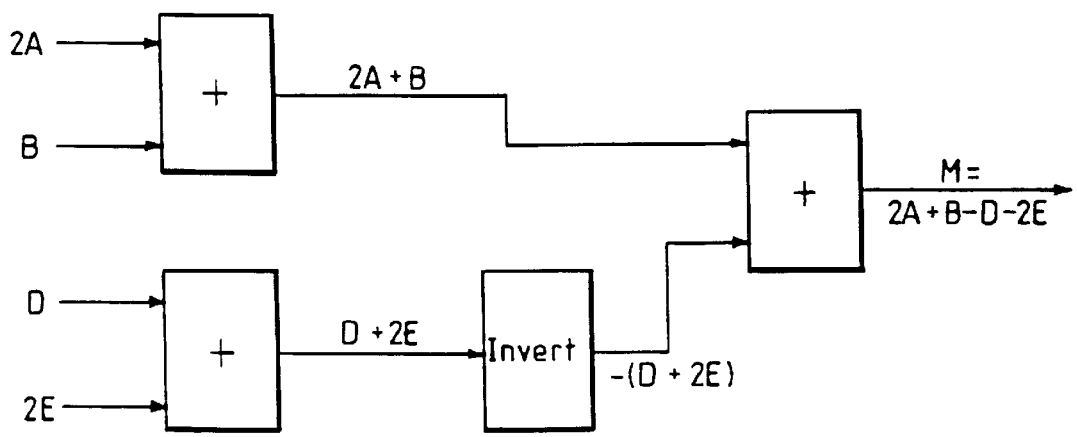
Figure 6:
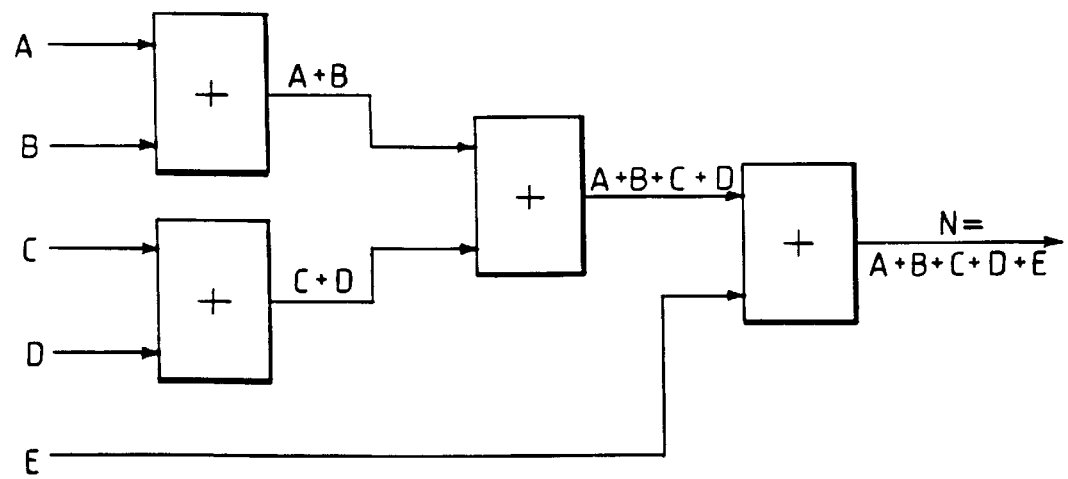
Figure 7A:
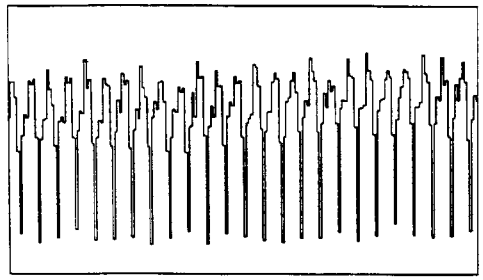
Figure 7B:
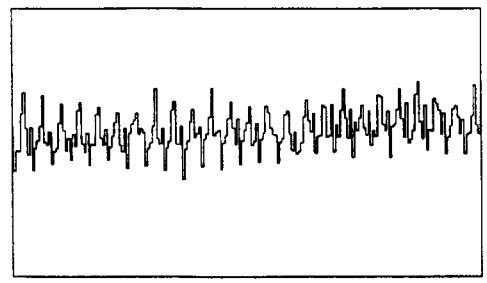
Figure 7C:
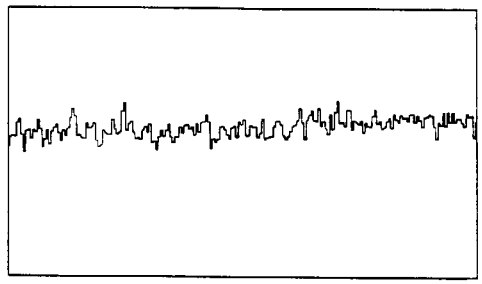
Figure 7D:
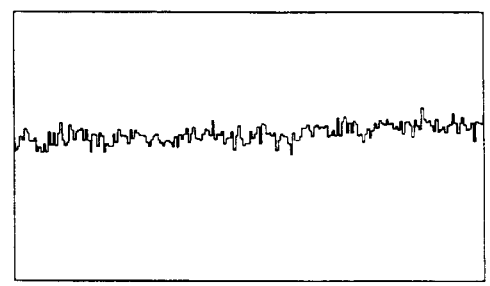
Figure 8A:
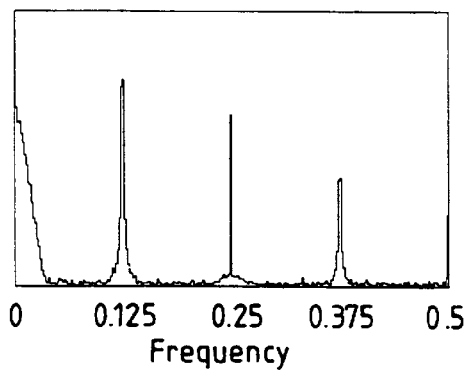
Figure 8B:
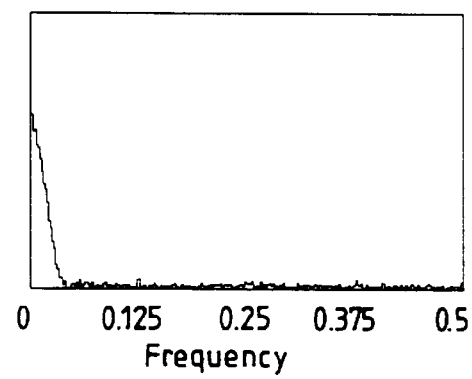

FIG. 4 is a flow diagram of a preferred embodiment of the method of the invention;

FIG. 5 is a block diagram of the electronics used to carry out what is shown in FIG. 4;

FIG. 6 shows in more detail part of FIG. 5;

FIG. 7 consists of graphs which show the result of integrating on a flat field at four successive stages of the method of FIG. 4;

FIG. 8 consists of two graphs showing the power spectre of the first and last flat fields of FIG. 7

DESCRIPTION OF THE PREFERRED EMBODIMENT

As just mentioned FIG. 4 is a flow diagram showing a preferred embodiment of the method defined above.

As shown in FIG. 5, during setup of the detector system the Look Up Table (LUT) is initially loaded by the computer with equal boundary positions for all values of M/N as shown in Table 1. An integration is then carried out. The derived M and N for each photon event are used as the address to the LUT. (FIG. 6 shows a block diagram of the electronics used to derive the values for M and N. Typically, 74LS238 integrated circuits are used for the adders and a 74LS540 integrated circuit is used for the invert function.) The 3 bit output of the LUT gives the centroid position. This is combined with the Row/Column CCD pixel address to define the Data Acquisition Memory address that is associated with that centroid position. The value held at this Memory address is then incremented by 1 to show that a photon event has occurred at that position. At the end of the integration the computer software analyses the data in the Data Acquisition Memory to find the level of fixed pattern noise, a typical result being shown in Flat Field 1 of Table 2. The LUT is then reloaded with new boundary positions, as is typically shown in Flat Field 2 of Table 2, and another integration carried out. This procedure is then repeated until the fixed pattern noise is minimized.

The 3-bit output of the LUT has 8 associated combinations (000, 001, 010, . . . , 110, 111). Each of these eight combination defines a respective one of the 8 channels associated with each section of M/N answer range. When an event is detected, the hardware (see FIG. 6) derives M and N. For each M/N, the LUT has been pre-programmed to output the associated channel number and, hence, the spatial position within the pixel.

FIG. 7 shows the result of the initial integration and three iterations of the procedure. Each flat field shows less pattern noise than the previous one, the last having a negligible amount. Table 2 below shows boundary values and the percentage of the total counts obtained in each channel for each flat field of FIG. 7. The third column shows the percentage of total counts in each channel obtained from having a look-up table loaded with the standard boundary values (column 2). The computer uses those percentage values to work out the new channel boundary values of column 4 which, when loaded into the look-up table, produce the percentages of column 5 on a subsequent flat field, and so on. The range of count values is gradually, reduced until it is within that expected from random system noise.

TABLE 2

| Channel Number | Flat Field 1 Boundaries | Counts % | Flat Field 2 Boundaries | Counts % |
|---|---|---|---|---|
| 0 | −0.5 → −0.375 | 7.32 | −0.5 → −0.3232 | 13.77 |
| 1 | −0.375 → −0.25 | 12.28 | −0.3232 → −0.1960 | 12.53 |
| 2 | −0.25 → −0.125 | 13.06 | −0.1960 → −0.0766 | 12.09 |
| 3 | −0.125 → 0 | 12.96 | −0.766 → 0.0439 | 12.90 |
| 4 | 0 → 0.125 | 14.57 | 0.0438 → 0.1481 | 11.23 |
| 5 | 0.125 → 0.25 | 14.18 | 0.1481 → 0.2563 | 12.09 |
| 6 | 0.25 → 0.375 | 13.92 | 0.2563 → 0.3671 | 12.21 |
| 7 | 0.375 → 0.5 | 11.71 | 0.3671 → 0.5 | 13.20 |

| Channel Number | Flat Field 3 Boundaries | Counts % | Flat Field 4 Boundaries | Counts % |
|---|---|---|---|---|
| 0 | −0.5 → −0.3359 | 12.79 | −0.5 → −0.3388 | 12.51 |
| 1 | −0.3359 → −0.2090 | 12.42 | −0.3389 → −0.2111 | 12.41 |
| 2 | −0.2089 → −0.0854 | 12.20 | −0.2111 → −0.0844 | 12.55 |
| 3 | −0.0854 → 0.0311 | 12.34 | −0.0844 → 0.0336 | 12.50 |
| 4 | 0.0311 → 0.1480 | 12.51 | 0.0336 → 0.1505 | 12.48 |
| 5 | 0.1480 → 0.2603 | 12.50 | 0.1505 → 0.2628 | 12.47 |
| 6 | 0.2603 → 0.3740 | 12.56 | 0.2628 → 0.3760 | 12.55 |
| 7 | 0.3740 → 0.5 | 12.69 | 0.3760 → 0.5 | 12.54 |

Anything periodic which is hidden in the system noise can be seen by taking the Fourier transform of a flat field. FIG. 8 shows the power spectra of the first and last flat fields of FIG. 7 and confirms that the pattern noise has been removed.

An important point about this technique is that it is very fast, each integration typically requiring 200 seconds in order that an accurate result is achieved with a 5-pixel algorithm. This is because the event profile and, consequently, the fixed pattern, are constant over a large area which allows the summation of a large number of counts in modulo-8. Thus, at the end of an integration the system holds just eight numbers, one in each of eight bins, with each bin holding the total number of all counts allocated to a given numbered channel. This is unlike the normal flat field where every pixel has to be treated separately and integration takes much longer.

The alteration of the boundary positions is done according to a linear distribution of events within a pixel. Although the distribution is known to be non-linear, this does not matter since the algorithm converges quickly, typically requiring only three or four iterations. By equalizing the number of events occurring in each channel, the alteration of channel boundaries achieves a linear distribution of events among the channels of a pixel.

Various algorithms may be used to alter the channel boundaries, and two will now be described. In the first algorithm, the eight numbers held in the eight bins are summed and then divided by 8 to give the mean count/channel. The width of each channel is then modified according to the formula:

$$\text{New width} = \text{Old width} + \tfrac{1}{8}(1 - (\text{Count in bin})/(\text{Mean count}))$$

This algorithm works best if there are large negative excursions in the fixed pattern noise.

In the second algorithm, a weighting W is calculated for each channel according to the formula:

$$W = (\text{Old width})/(\text{Count in bin})$$

The new width of the channel is then calculated as:

$$\text{New width} = w/\Sigma w$$

$\Sigma w$ being the summation over all eight channels. This algorithm works best if there are large positive excursions in the fixed pattern noise.

Although the method described above gives an accurate result there will be small errors when the result of M/N is close to the boundary of two channels. These errors depend upon the precision of M and N. However, these boundary errors are random and are thus smoothed on integration.

Figure 1A:
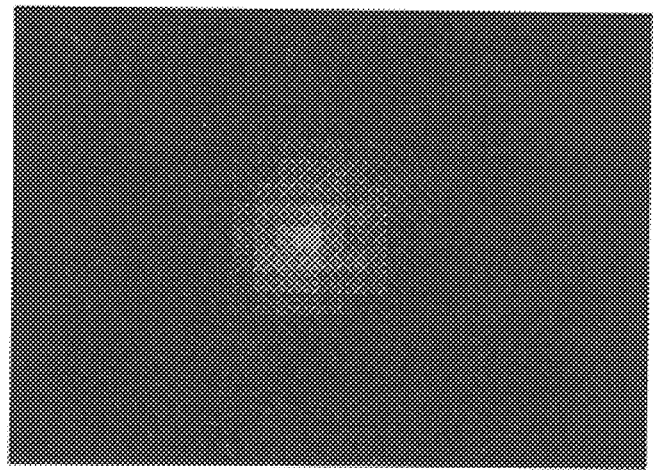
FIG. 1a shows a typical photon event which is to be detected.
Figure 1B:
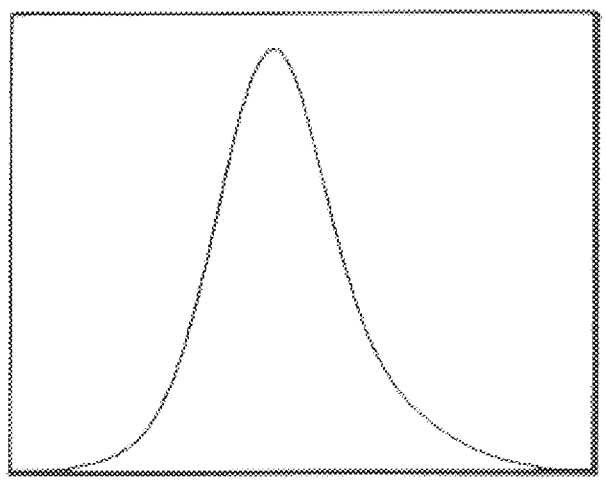
Figure 2:
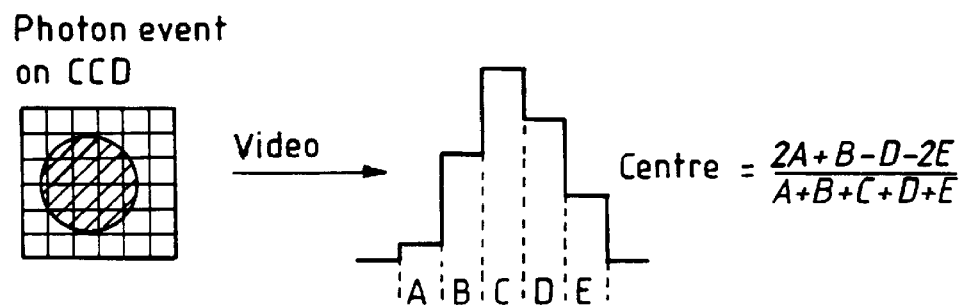
FIG. 2 depicts the algorithm used to determine the centre of gravity of a photon event.
Figure 3A:
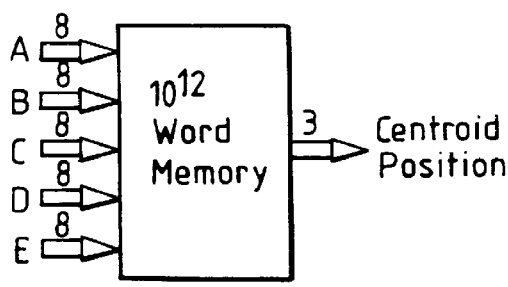
FIGS. 3a and 3b show two ways of implementing the algorithm of FIG. 2.
Figure 3B:
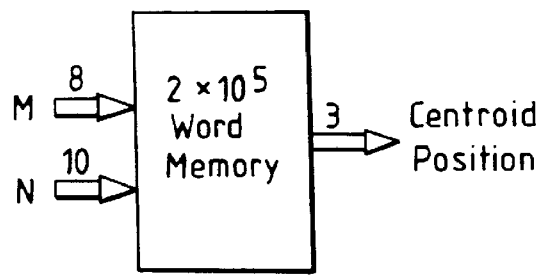

An important feature of the method is that it can cope with asymmetrical profiles by ensuring that, when the result of the algorithm lies outside the range defined in the look-up, the event is placed in the nearest channel of the adjacent pixel. It does this in hardware using an asymmetry flag. Where the result of M/N is outside of the range −0.5 to +0.5 then this means that the centre of gravity of the event is not in the same pixel as that containing the peak data. If the result is <−0.5 then the centre of gravity is in the previous pixel, and if >+0.5 then the centre of gravity is in the next pixel, B and D respectively in FIG. 2.

The asymmetry profile flag is a two bit flag that is output by the Look Up Table when the result of M/N is either <−0.5 (first bit set) or >+0.5 (second bit set) and tells the hardware to take the previous value output by the Look Up Table as the centroid position, if the result of M/N is <−0.5, or take the following value output by the Look Up Table, if the value of M/N is >+0.5. In either of these cases the centroiding is then carried out, not with the peak data pixel at the centre as is normal, but with B or D respectively. As an example, if the centre of gravity is in B, then the centroid values for M and N are taken as:

$$M = 2Z + A - C - 2D$$

$$N = Z + A + D + C + D$$

where Z=data in the pixel prior to A.

The method can also be used with 3-pixel algorithms but, so long as an event covers more than three pixels, a 5-pixel algorithm should give more accurate event positions since otherwise information is being lost about the wings of the event. However, it is desirable that the events are as compact as possible since wide events decrease centroiding accuracy and increase coincidence effects.

I claim:

1. A method of setting up a photon counting detector, to enable it to carry out a centroiding procedure in which a photon event occurring in a given spatial range is allocated to one of a plurality of channels into which the range is divided, the said method comprising the step of:

(a) sub-dividing the range into a plurality, n, of channels defined by boundaries and loading the channel boundaries into a look-up table;

and comprising the further steps of:

(b) performing an integration on a flat field and, via the look-up table, allocating photon events to the channels defined in step (a);

(c) counting the number of events allocated to each channel; and (d) altering the channel boundaries, while retaining n channels in directions tending to equalise the number of events allocated to each.

2. A method of setting up a photon counting detector, to enable it to carry out a centroiding procedure in which a photon event occurring in a given spatial range is allocated to one of a plurality of channels into which the range is divided, the said method comprising the step of:

(a) sub-dividing the range into a plurality of channels defined by boundaries and loading the channel boundaries into a look-up table;

and comprising the further steps of:

(b) performing an integration on a flat field and, via the look-up table allocating photon events to the channels defined in step (a):

(c) counting the number of events allocated to each channel; and (d) altering the channel boundaries in directions tending to equalize the number of events allocated to each repeating steps (b), (c), and (d), each time utilizing the altered boundaries, until the variation between the numbers of events held by the channels is at an acceptable level.

3. A method according to claim 1, wherein in step (d) the width of each channel is modified according to the formula:

$$\text{New width} = \text{Old width} + \tfrac{1}{8}(1 - (\text{Count in bin})/(\text{Mean count}))$$

where the expression "Count in bin" refers to the number of events allocated to the channel concerned when it has its old width, and "Mean count" refers to the mean number of events allocated to each channel.

4. A method according to claim 1, wherein in step (d) the width of each channel is modified according to the formula:

$$\text{New width} = W/\Sigma W$$

where W is calculated according to the formula:

$$W = (\text{old width})/(\text{Count in bin})$$

and "Count in bin" refers to the number of events allocated to the channel concerned when it has its old width, and $\Sigma W$ is the summation of W over all channels.

5. A method according to claim 1, wherein in step (a) the channels are of equal width to one another.

6. A method according to claim 1, wherein in step (c) the amplitude of each said photon event is detected in a plurality of pixels along a given axis, the centre of gravity of the photon event along the said axis is ascertained according to a predetermined formula, and the said photon event allocated to a respective one of the channels on the basis of its centre of gravity.

7. A method according to claim 6, wherein the said predetermined formula is:

$$\text{Centre of gravity} = M/N$$

where $$M = 2A + B - D - 2E$$

and $$N = A + B + C + D + E$$

and A, B, C, D and E are values of the amplitude even in five continuous pixels along said axis.

8. A method according to claim 6, wherein a centre of gravity is initially ascertained according to the formula set out in claim 7 and found to give a value for M/N such that $|M/N| > 0.5$, and wherein the values of M and N are then recalculated according to the formula:

$$M = 2Z + A - C - 2D$$

$$N = Z + A + B + C + D$$

where Z=data in the pixel prior to A.

9. A method according to claim 8, wherein M and N are calculated separately and used as the address of a data store which holds a look-up table containing the values of M/N.

10. An improved method of carrying out a centroiding procedure in a photon counting detector, said method being of the type wherein a photon event occurring in a given spatial range is detected by the detector to give a respective amplitude in each of a plurality of contiguous pixels along a given axis, the centre of gravity of the photon event along the said given axis is ascertained according to a predetermined formula, and the event allocated to an appropriate one of a plurality of channels into which the range is divided, according to its centre of gravity, wherein the improvement comprises initially setting up the detector by performing the following steps:

(a) sub-dividing the range into a plurality, n of channels defined by boundaries and loading the channel boundaries into a look-up table:

and comprising the further steps of:

(b) performing an integration on a flat field and, via the look-up table, allocating photon events to the channels defined in step (a);

(c) counting the number of events allocated to each channel; and (d) altering the channel boundaries, while retaining n channels in directions tending to equalise the number of events allocated to each.

\* \* \* \* \*

UNITED STATES PATENT AND TRADEMARK OFFICE
CERTIFICATE OF CORRECTION

PATENT NO. : 5,812,690
DATED : Sep. 22, 1998
INVENTOR(S) : John Lawrence Fordham It is certified that error appears in the above-identified patent and that said Letters Patent is hereby corrected as shown below:

On the title page, item [30]:

please insert --February 8, 1991 [GB] United Kingdom 9102713.6--

Signed and Sealed this

Twentieth Day of July, 1999

*Attest:*

Q. TODD DICKINSON

*Attesting Officer*  *Acting Commissioner of Patents and Trademarks*